3,419,321
LASER OPTICAL APPARATUS FOR CUTTING HOLES
Richard B. Barber, Toledo, Ohio, and Lloyd G. Cross and William G. Prince, Ann Arbor, Mich., assignors to Lear Siegler, Inc.
Filed Feb. 24, 1966, Ser. No. 529,798
1 Claim. (Cl. 350—8)

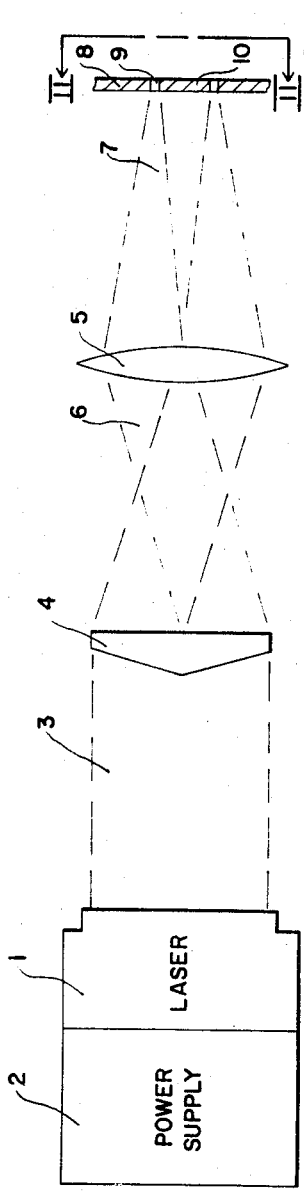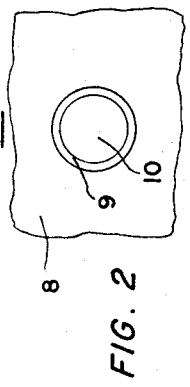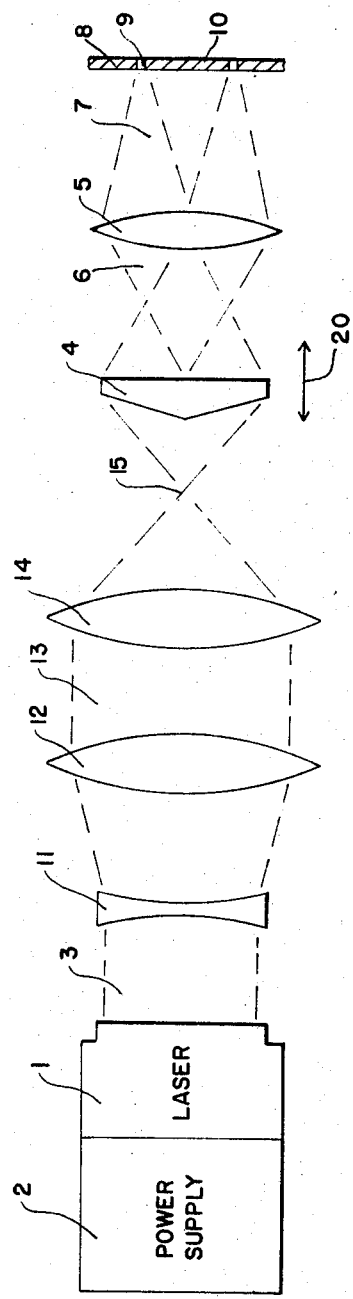
INVENTORS
RICHARD B. BARBER
LLOYD G. CROSS
WILLIAM G. PRINCE
ATTORNEYS United States Patent Office 3,419,321
Patented Dec. 31, 1968

ABSTRACT OF THE DISCLOSURE

Basically, the instant invention provides an optical means for cutting holes of large diameter. A relatively large diameter ring of intense energy is focused onto a workpiece to effectively blank out large diameter openings. This blanking operation is accomplished by collimating the intense light energy of a laser and focusing it onto an axicon. The axicon will effect formation of a ring of light energy which in turn is focused onto the workpiece by a lens.

---

This invention relates to an apparatus for creating intense heat in a ring-shaped pattern for cutting holes and the like. More particularly, this invention relates to such an apparatus which utilizes a means for producing a beam of coherent waves of electromagnetic energy, such as a laser.

A maser is a solid state microwave amplifier. When substances such as ruby are used as an amplifier in the visible portion of the radiation spectrum, the device is known as an optical maser, or laser. Masers, optical masers and lasers are now well known and commercially available. They are characterized by their ability to produce electromagnetic radiation which is very directional, extremely powerful, essentially mono-chromatic and coherent.

Lasers have already been used to provide a means of cutting holes in objects. There are several presently known arrangements for accomplishing this. The first arrangement utilizes a simple lens system to focus a laser beam to a spot to melt and vaporize material for cutting a hole in a work piece. Such an arrangement is not entirely suitable since the maximum hole size available with a laser operating with up to 50 joules output is approximately 0.040 inch in diameter in 1/16 inch thick material. Another arrangement uses multiple laser firings while the work piece is moved. This increases the hole size by using the multiple laser firings to trace the perimeter of the hole. However, such an arrangement is not entirely satisfactory because unless the work is rotated at extremely high speeds, the resulting holes are very irregular and nearly impossible to reproduce consistently for production use. A third arrangement utilizes a rotating dove prism in the optical path of the laser beam. Again, such an arrangement has the disadvantage that the rotating prism must be turning at extremely high speeds (on the order of 500 revolutions per second) to be effective and if the intensity of the laser is not uniform in time, a varying depth of the cut will result.

It is therefore an object of this invention to provide an improved apparatus for creating intense heat in a ring-shaped pattern for cutting holes and the like.

A further object of this invention is to provide such apparatus which utilizes a means for producing a beam of coherent waves of electromagnetic energy, such as a laser.

A further object of this invention is the provision of such apparatus which utilizes the unique optical features of an axicon.

A still further object of this invention is the provision of such apparatus which enables one to vary the perimeter of the hole being cut.

An additional object of the invention is the provision of such apparatus which is relatively simple in construction and efficient to operate.

These and further objects of this invention will become apparent to those skilled in the relevant arts upon reading the following specification, in conjunction with the accompanying drawing, wherein:

FIG. 1 is a schematic diagram of an embodiment of the method and apparatus of this invention;

FIG. 2 is an end view of the apparatus shown in FIG. 1, looking in the direction of the arrows; and FIG. 3 is a schematic diagram similar to FIG. 1, showing certain modifications.

Briefly, this invention relates to an apparatus for creating intense heat in a ring-shaped pattern for cutting holes and the like, including a means for producing a beam of coherent waves of electromagnetic energy, such as a laser. An axicon is positioned in the path of the beam. A lens is positioned to receive the beam after it passes through the axicon, the lens focusing the beam received to a ring of small thickness.

Referring more specifically to the drawing, the reference numeral 1 (FIG. 1) designates a laser of conventional construction having a power supply 2, the laser 1 emitting a beam 3 of coherent waves of electromagnetic energy. An axicon 4 is positioned in the path of the beam 3. An axicon is an optical device already well known in the optical art. For purposes of this application, an axicon may be defined as an optical device which produces a darkened area at the center of a beam of light when light passes through it. This darkened area may be a cone if the axicon is circular or may be elongated if the axicon is elongated. For purposes of illustration, the axicon 4 of FIG. 1 is circular and the beam 3 is turned in upon itself and directed towards the lens 5. The lens 5 focuses the ring of light 6 which it received from the axicon 4 into a ring 7 of small thickness. It should be understood that FIGS. 1–3 are schematic only and not drawn to scale. This ring 7 of laser light then strikes the work piece 8 cutting a ring-shaped circle 9 therein, leaving an opening after the plug 10 is removed. This is clearly shown in FIG. 2. It will thus be seen that the size of the hole possible is not limited by the energy density concentrated on a single spot. It has been shown that with this method and apparatus, perfectly round holes up to 1/4 inch in diameter are possible in thin foils with a single laser firing and repeated shots have penetrated up to 1/16 inch material with a 1/4 inch diameter hole. It will be seen that this is a marked change from the 0.040 inch diameter hole obtained in 1/16 inch thick material with a laser operating by concentrating its energy on a single spot.

FIG. 3 is a schematic diagram similar to FIG. 1, showing certain modifications. Again, a laser 1 having a power supply 2 and capable of emitting a beam 3 of coherent waves of electromagnetic energy is used. A pair of collimating lenses 11 and 12 are provided to collimate the beam 3 as designated by the reference numeral 13. A focusing lens 14 receives the collimated beam 6, focusing it to the point 15. An axicon 4 as already described hereinbefore is positioned to receive the beam 13 beyond the point 15. As already described with respect to FIG. 1, the beam 6 emerging from the axicon 4 passes through the focusing lens 5 which focuses the ring to a very small thickness designated by the reference numeral 7. The collimated lenses 11 and 12 are used because for any given hole radius the ring area is largely dependent upon the laser beam divergence. When the laser beam is collimated, the energy density is increased for more efficient operation. Further, by focusing the collimated beam to a point before it reaches the axicon, the radius of the ring is made dependent on the distance between the axicon and the lens 14. Therefore, movement of the axicon in the directions shown by the arrow 20 allows the operator to vary the size of the hole being cut.

It will be seen that this apparatus much more efficiently utilizes laser energy to cut holes larger than previously possible. Further, the use of complex structures requiring difficult motions has been eliminated. Additionally, one is able to vary the size of the holes with one embodiment of the invention. The apparatus may be operated to produce uniform and consistent holes. It should be understood that use of the words "ring-shaped" includes shapes ranging from circular to elongated perimeter patterns. Additionally, it should be understood that the invention is not limited to the cutting of holes, but the provision of intense heat in a ring-shaped pattern could be used in other applications, for example welding components together when the weld can comprise such a shape.

While only certain embodiments of this invention have been shown and described, it may be possible to practice the invention through the use of certain other embodiments without departing from the spirit and scope thereof. Such other embodiments are to be considered a part of this invention unless the following claim specifically states otherwise.

We claim:

1. An apparatus for creating intense heat in a ring-shaped pattern for cutting holes and the like, including:

means for producing a beam of coherent waves of electromagnetic energy;

an axicon positioned in the path of said beam for providing a ring-shaped pattern of light;

a collimating lens system positioned in the path of said beam between said beam producing means and said axicon for collimating said beam prior to its entering said axicon;

a first focusing lens positioned between said collimating lens system and said axicon for focusing said beam prior to its striking said axicon, whereby relative movement of said axicon with respect to said first focusing lens varies the perimeter of said ring-shaped pattern; and a second focusing lens positioned in the path of said beam for receiving said beam after it emerges from said axicon and focusing it to a hollow ring-shaped pattern of relatively small thickness.

References Cited

UNITED STATES PATENTS

| | | | |
|---|---|---|---|
| 2,423,718 | 8/1947 | Morrison | 350—189 |
| 3,096,767 | 7/1963 | Gresser et al. | |
| 3,217,088 | 11/1965 | Steierman. | |
| 3,325,819 | 6/1967 | Fraser. | |
| 2,759,393 | 8/1956 | McLeod | 350—189 X |

DAVID SCHONBERG, *Primary Examiner.*

P. R. GILLIAM, *Assistant Examiner.*

U.S. Cl. X.R.

219—384; 321—94.5; 350—189